(12) United States Patent
Reiderman (10) Patent No.: US 8,362,781 B2
(45) Date of Patent: Jan. 29, 2013

(54) METHOD FOR ELIMINATING BOREHOLE ECCENTRICITY EFFECT IN TRANSVERSAL INDUCTION SENSOR

(75) Inventor: Arcady Reiderman, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 766 days.

(21) Appl. No.: 12/188,855

(22) Filed: Aug. 8, 2008

(65) Prior Publication Data
US 2010/0033187 A1 Feb. 11, 2010

(51) Int. Cl.
*G01V 3/08* (2006.01)
*G01V 3/20* (2006.01)

(52) U.S. Cl. ............... 324/346; 324/351; 324/369

(58) Field of Classification Search ............ 324/346, 324/351, 369
See application file for complete search history.

(56) References Cited

U.S. PATENT DOCUMENTS

| | | | |
|---|---|---|---|
| 5,508,616 A * | 4/1996 | Sato et al. | 324/343 |
| 6,556,016 B2 * | 4/2003 | Gao et al. | 324/343 |
| 6,933,726 B2 | 8/2005 | Chen et al. | |
| 7,193,420 B2 | 3/2007 | Chen et al. | |
| 2003/0229450 A1 * | 12/2003 | Strickland | 702/10 |
| 2004/0183538 A1 * | 9/2004 | Hanstein et al. | 324/339 |
| 2006/0255799 A1 * | 11/2006 | Reiderman | 324/303 |
| 2007/0236221 A1 * | 10/2007 | Merchant et al. | 324/339 |
| 2009/0240437 A1 * | 9/2009 | Samworth | 702/11 |

OTHER PUBLICATIONS

Sun, et al. "Analysis and Correction of Borehole Effect on the Responses of Multicomponent Induction Logging Tools" Progress in Electromagnetics Research, PIER 85, 211-226, 2008.
Sun, et al. "Vector Finite Element Analysis of Multicomponent Induction Response in Anisotropic Formations". Progress in Electromagnetics Research, PIER 81, 21-39, 2008.
Stanley C. Gianzero, "Effect of Sonde Eccentricity on Responses of Conventional Induction-Logging Tools". Geoscience Electronics, IEEE Transactions. vol. 16, Issue 4, Oct. 1978. pp. 332-339.
Xiao, et al. "A New Asymmetrical Array Induction Logging Tool". SPE 101930. SPE Annual Technical Conference and Exhibition held in San Antonio, TX Sep. 24-27, 2006.

* cited by examiner

*Primary Examiner* — Bot Ledynh
(74) *Attorney, Agent, or Firm* — Cantor Colburn LLP (57) ABSTRACT

An instrument for measuring a property of a subsurface material, the instrument including: a magnetic material surrounding a volume in at least two dimensions; and a receiver adapted for receiving energy related to the property of the subsurface material; wherein the receiver is disposed at an exterior surface of the magnetic material.

23 Claims, 7 Drawing Sheets

METHOD FOR ELIMINATING BOREHOLE ECCENTRICITY EFFECT IN TRANSVERSAL INDUCTION SENSOR

BACKGROUND OF THE INVENTION

1. Field of the Invention

The invention disclosed herein relates to performing measurements of a property of a formation from a borehole.

2. Description of the Related Art

Exploration for hydrocarbons generally requires performing several types of measurements of properties of a geologic formation. Many types of measurements are conducted in a borehole that penetrates the formation. Measuring a property of the formation from the borehole is called "well logging" in the art of hydrocarbon exploration.

One type of measurement used in hydrocarbon exploration is induction well logging. Induction well logging is based on the principle of inducing current loops in the formation and measuring a signal resulting from the current loops. In a simplified version of an instrument for performing induction well logging, an alternating current is conducted through a transmitter coil, thereby, creating an alternating magnetic field in the formation. From the alternating magnetic field, loops of alternating current are created in the formation. The alternating current loops in the formation, in turn, produce their own alternating magnetic field. When the alternating magnetic field produced by the alternating current loops in the formation intersect a receiver coil in the instrument, a current in induced in the receiver coil. The current induced in the receiver coil (referred to as an output signal) is proportional to the conductivity of the formation, which may include contributions from different regions.

Eccentricity of the instrument in the borehole may cause an error in the output signal due to electric current flowing in the direction of the axis of the borehole. The current may be arbitrarily distributed over the cross-section of the borehole. In addition, a part of this current may flow in a conductive support in the instrument and may contribute to the error in the output signal. The effect of the current in the conductive support may be reduced by making the support in separate electrically disconnected pieces. However, the electrically disconnected pieces may not completely solve this problem.

Another approach to the problem of eccentricity of the induction instrument in the borehole is disclosed in U.S. Pat. No. 6,933,726. This approach requires positioning a transversal receiver coil symmetrically with respect to the support. Use of this approach, however, requires high positioning accuracy.

Therefore, what are needed are techniques that do not require high positioning accuracy of a transversal receiver coil in a logging instrument. Preferably, the techniques allow the transversal receiver coil to be placed asymmetrical to a current flowing internal to the logging instrument without significant degradation of an output signal from the receiver coil.

BRIEF SUMMARY OF THE INVENTION

Disclosed is an instrument for measuring a property of a subsurface material, the instrument including: a magnetic material surrounding a volume in at least two dimensions; and a receiver adapted for receiving energy related to the property of the subsurface material; wherein the receiver is disposed at an exterior surface of the magnetic material.

Also disclosed is a method for measuring a property of a subsurface material, the method including receiving energy from the subsurface material using a receiver disposed at an exterior surface of a magnetic material wherein the magnetic material surrounds a volume in at least two dimensions; and relating the energy to the property of the subsurface material.

Further disclosed is an instrument for measuring a property of a subsurface material, the instrument having: means for receiving energy related to the property of the subsurface material; and means for shielding a magnetic field internal to the instrument from the means for receiving energy.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are techniques for allowing asymmetrical positioning of a transversal receiver coil with respect to a current flowing internal to a logging instrument. The techniques prevent significant degradation of an output signal. Significant degradation of the output signal is prevented by shielding the transversal receiver coil from the magnetic field created by the current. The techniques are presented with respect to an induction logging instrument, however, the techniques are also applicable to any logging instrument having a transversal receiver coil or antenna.

Figure 1:
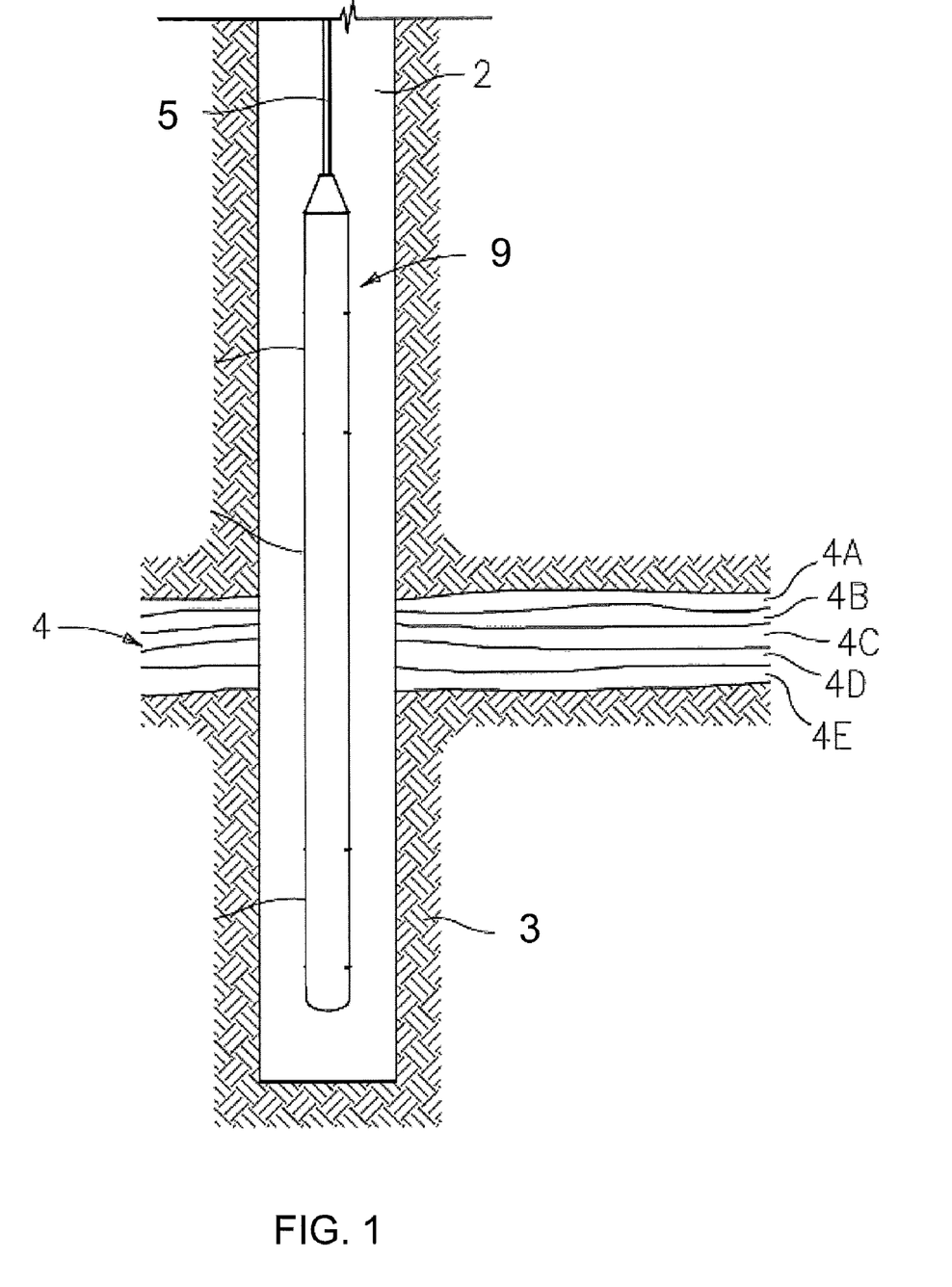
FIG. 1 illustrates an exemplary embodiment of a logging instrument in a borehole penetrating the earth.

Referring to FIG. 1, a well logging instrument 9 is shown disposed in a borehole 2. The borehole 2 is drilled through earth 3 and penetrates formations 4, which include various formation layers 4A-4E. In one embodiment, the logging instrument 9 is lowered into and withdrawn from the borehole 2 by use of an armored electrical cable 5 or similar conveyance as is known in the art. In other embodiments, the logging instrument 9 may perform measurements of a property of the formations 4 during drilling operations, referred to as measurement-while-drilling (MWD).

In typical embodiments, the borehole 2 includes materials such as would be found in oil exploration, including a mixture of liquids such as water, drilling fluid, mud, oil and formation fluids that are indigenous to the various formations. It will be recognized that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area). The term "subsurface material" is used to recognize that the logging instrument 9 may be used to measure a property of the formations 4 or other non-formation material.

For convenience, certain definitions are presented. The term "receiver" relates to a sensor for receiving energy emitted from a subsurface material. In general, the energy is emitted in response to a stimulus received by the subsurface material. One example of the stimulus is an alternating magnetic field created by an induction logging instrument. One example of the energy received is at least one of current and voltage induced in a sensor such as an antenna or a coil used for receiving the energy. The term "transversal" relates to at least one directional component of a plane of a coil being perpendicular to the axis of the borehole 2. The term "surrounding a volume in at least two dimensions" relates to a shape that includes a perimeter that can encircle the volume. The perimeter can be established in two dimensions (i.e., on a plane) or three dimensions. A hollow cylinder is one example of a shape surrounding a volume (where the volume is the center of the hollow cylinder) in at least two dimensions.

Figure 2A:
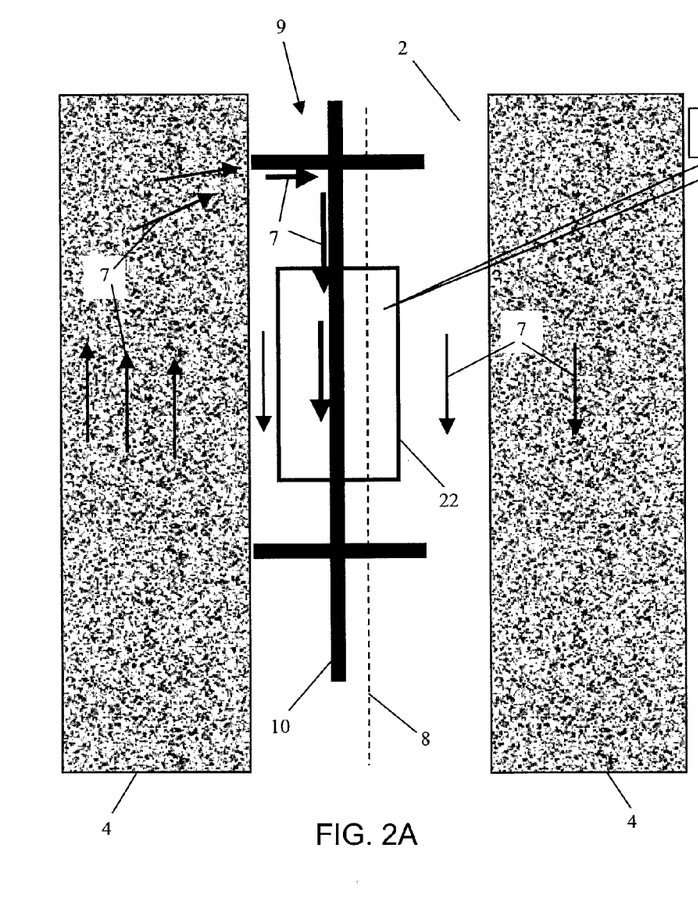
FIG. 2A and FIG. 2B, collectively referred to herein as FIG. 2, depict aspects of an electric current flowing through the borehole.

The origin of an undesired signal due to asymmetry of the transversal receiver coil with respect to a conductive support in the logging instrument 9 is illustrated in FIG. 2. Referring to FIG. 2A, an exemplary embodiment of the logging instrument 9 is shown disposed in the borehole 2 penetrating a layer of the formations 4. The logging instrument 9 is shown eccentric to an axis 8 of the borehole 2. The logging instrument 9 includes a conductive support 10 and a transversal receiver coil 22 (shown disposed in the X-Z plane). Again referring to FIG. 2A, a parasitic current 7 is shown flowing through the layer of the formations 4, the borehole 2, and the conductive support 10 due to the eccentricity of the instrument 9 in the borehole 2.

Figure 2B:
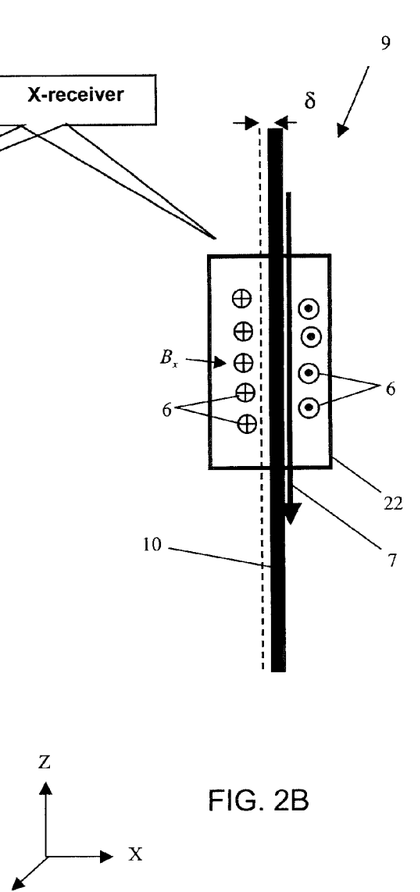

FIG. 2B illustrates a magnetic field 6 (designated $B_x$) created by the parasitic current 7 flowing in the conductive support 10. Referring to FIG. 2B, crosses and dots represent the direction of the magnetic field 6 into and out of the X-Z plane respectively. If the center of the transversal receiver coil 22 is not exactly aligned with the center of the conductive support 10, then the total magnetic flux in the area defined by the coil 22 is not zero and an error signal is generated. FIG. 2B depicts a positioning error or offset $\delta$ of the coil 22 with respect to the support 10.

Figure 3A:
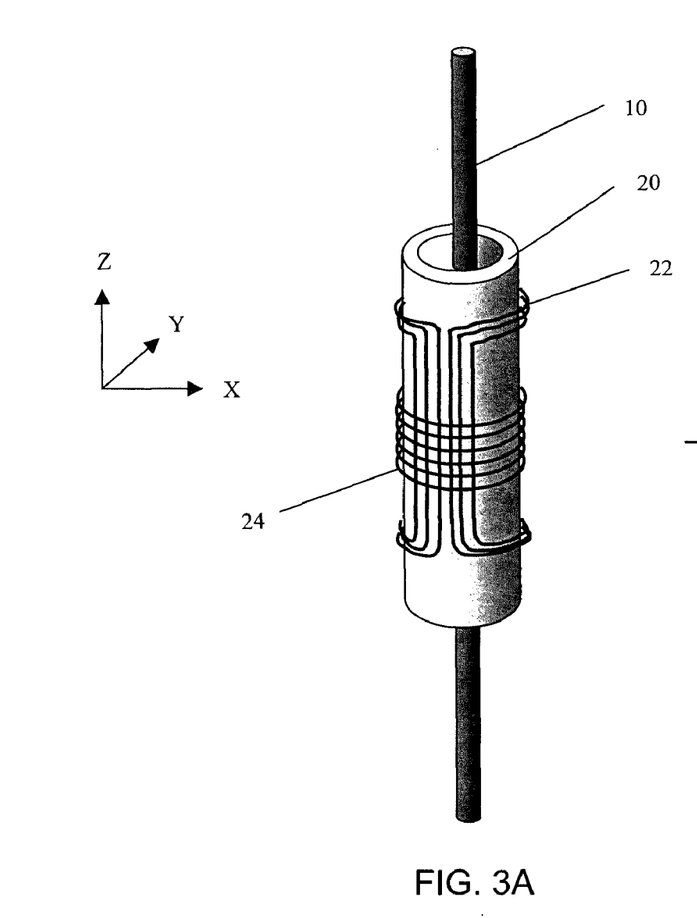
FIG. 3A and FIG. 3B, collectively referred to herein as FIG. 3, depict aspects of shielding a transversal receiver coil from a magnetic field internal to the logging instrument.
Figure 3B:
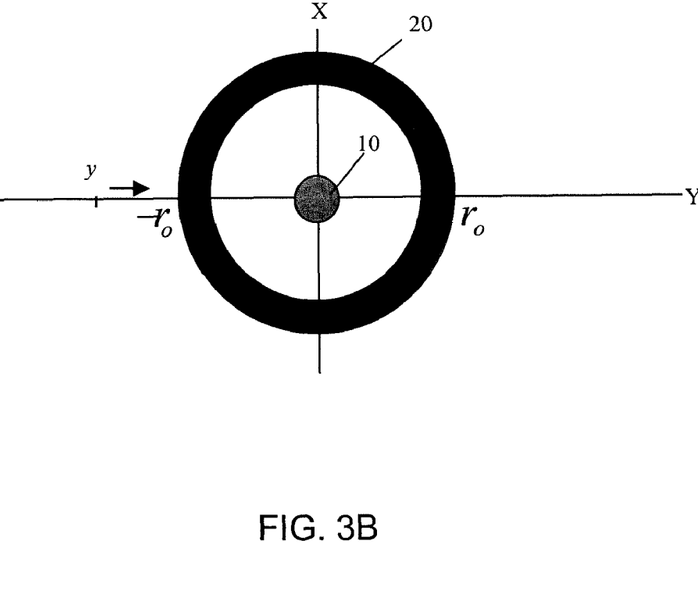

FIG. 3 illustrates an exemplary embodiment of apparatus for reducing the error signal due to the offset $\delta$. Referring to FIG. 3A, the error signal can be reduced by using a core 20 shaped as a hollow cylinder. The core 20 surrounds the conductive support 10. The core 20 shields the coil 22 from the magnetic field 6. To provide the shielding, the core 20 is made from a magnetic material. In some embodiments, the core 20 may be made of a ferrite material. Two receiver coils, the transversal receiver coil 22 and a longitudinal receiver coil 24, are shown disposed at the core 20 in a co-located coil arrangement. FIG. 3B shows the central cross-section (perpendicular to the borehole axis 8) of the transversal receiver coil 22. Referring to FIG. 3B, wire for the coil 22 is placed at $x=-r_0$ and $x=+r_0$. The coils 22 and 24 may have one or more turns of wire.

While in the embodiment of FIG. 3 the core 20 is in the shape of a hollow cylinder, the core 20 can be implemented in any shape that surrounds a volume in which a magnetic field can exist. The core 20 generally has a uniform thickness as shown in FIG. 3 to provide uniform shielding.

Figure 4A:
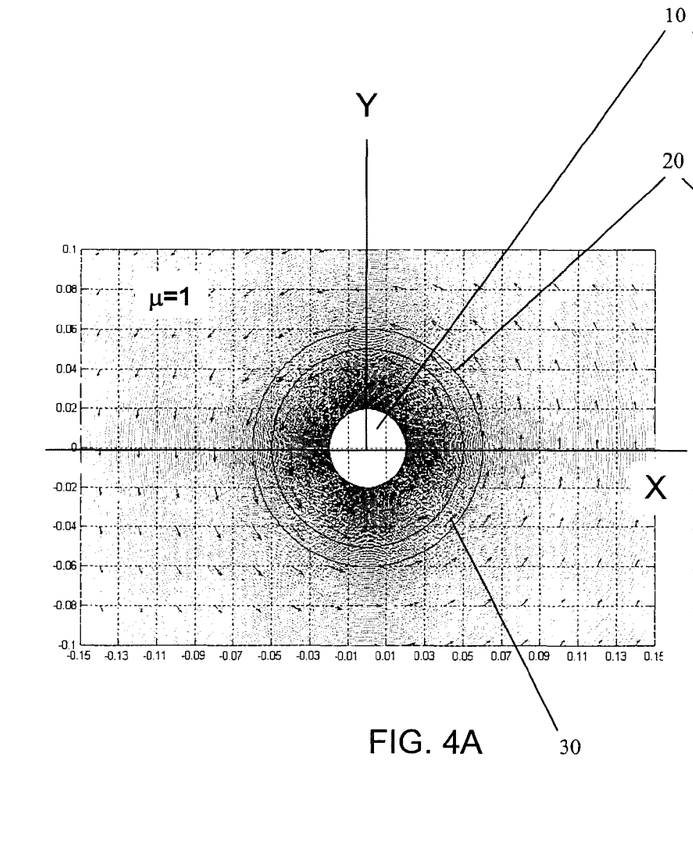
FIG. 4A and FIG. 4B, collectively referred to herein as FIG. 4, depict aspects of a magnetic field generated by a current flowing through the center of the logging instrument.
Figure 4B:
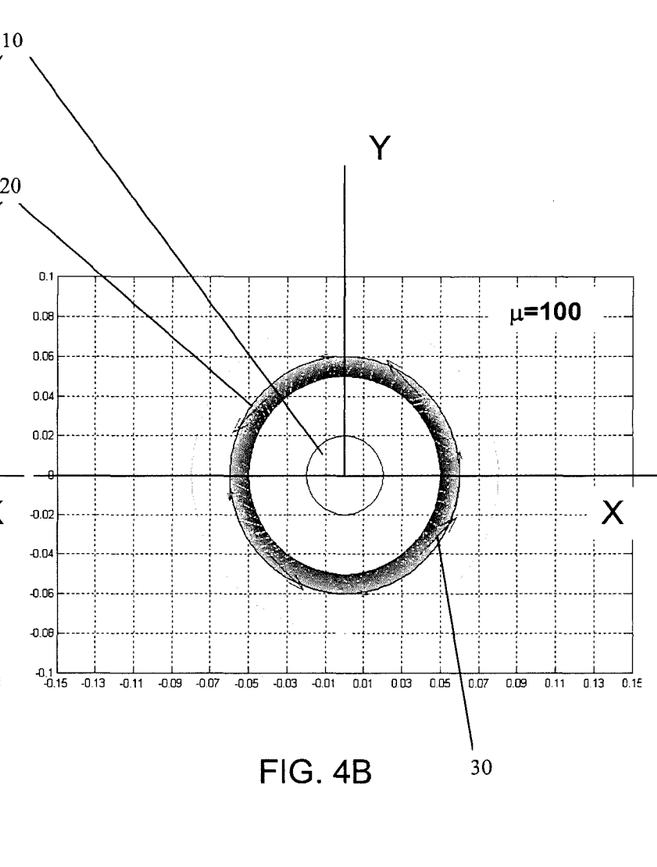

FIG. 4 and FIG. 5 illustrate qualitative pictures of magnetic flux lines 30 in the central cross-section of the core 20. FIG. 4 represents the case where the conductive support 10 is centered with respect to the core 20 (i.e., $\delta=0$). The core 20 of FIG. 4A has magnetic permeability $\mu=1$ (i.e., no magnetic material). The core 20 of FIG. 4B has magnetic permeability $\mu=1000$ (i.e., ferrite material). FIG. 4A and FIG. 4B illustrate the fact that the integral of the magnetic field 6 ($B_x$) between point $x=-r_0$ and $x=+r_0$ is zero for the symmetrical positioning of the coil 22 (disposed at the exterior surface of the core 20) with respect to the conductive support 10. Thus, the electromotive force (EMF) generated in the coil 22 for the embodiment of FIG. 3 may be represented as:

$$EMF = \omega \cdot \int_{-r_0}^{r_0} B_x dy = 0.$$

Figure 5A:
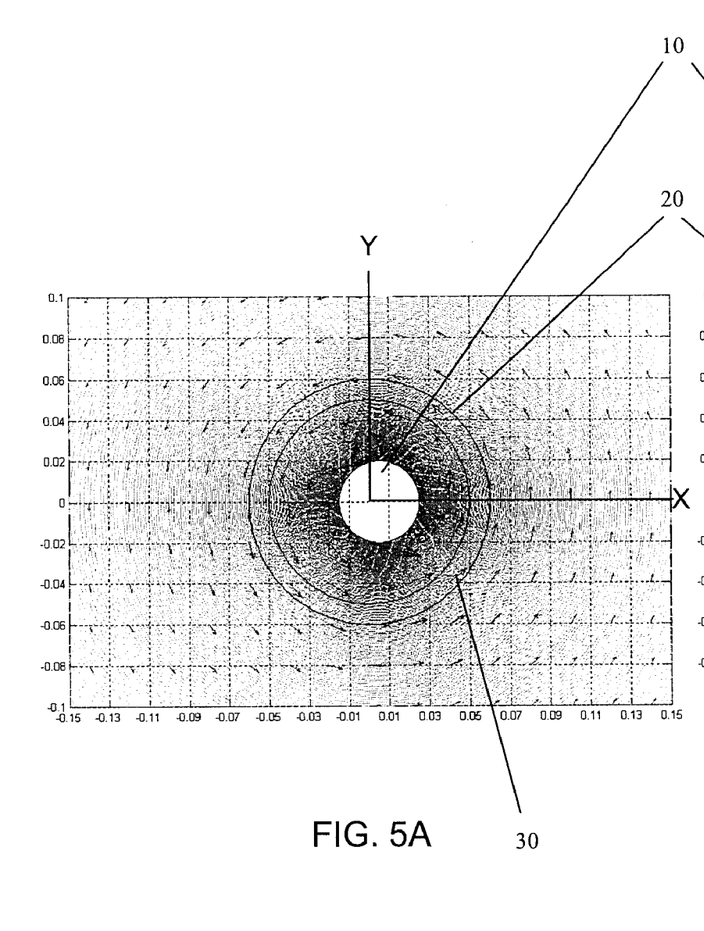
FIG. 5A and FIG. 5B, collectively referred to herein as FIG. 5, depict aspects of the magnetic field when the current is flowing offset to the center of the logging instrument.
Figure 5B:
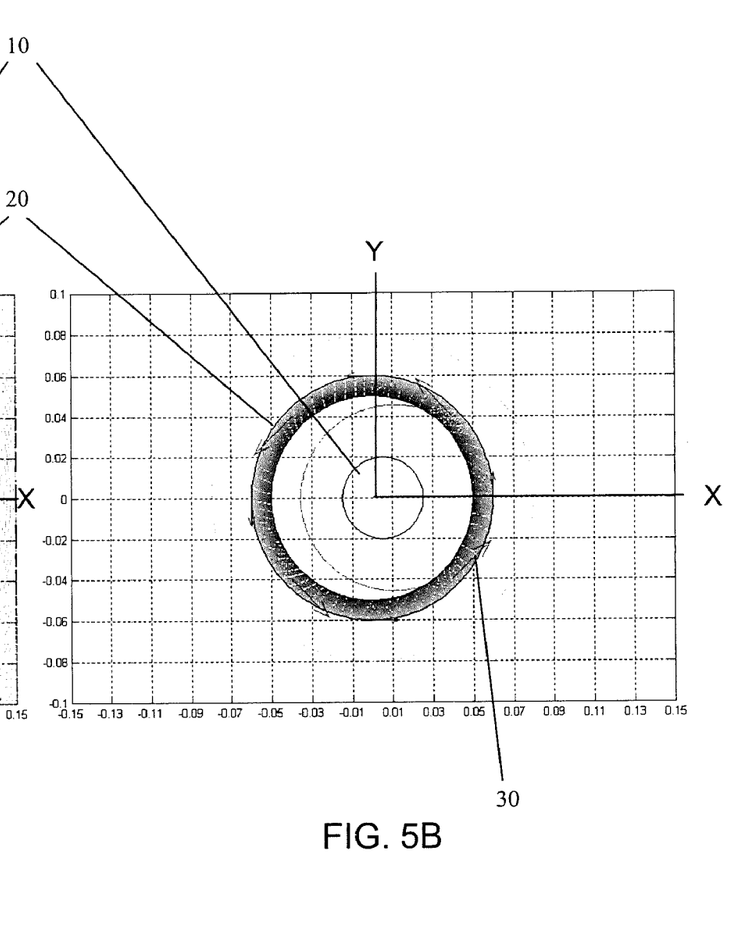

FIG. 5 represents the case where the offset of the conductive support 10 is nonzero (i.e., $\delta \neq 0$). The core 20 of FIG. 5A has magnetic permeability $\mu=1$ (i.e., no magnetic material). The core 20 of FIG. 5B has magnetic permeability $\mu=1000$ (i.e., ferrite material). If no magnetic material is present in the core ($\mu=1$) as represented in FIG. 5A, then the lines of the magnetic field 6 are asymmetrical with respect to the wire of the coil 22 at positions $x=-r_0$ and $x=+r_0$. Thus, the EMF generated in the coil 22 for the embodiment of FIG. 4A may be represented as:

$$EMF = \omega \cdot \int_{-r_0}^{r_0} B_x dy \neq 0.$$

Figure 6A:
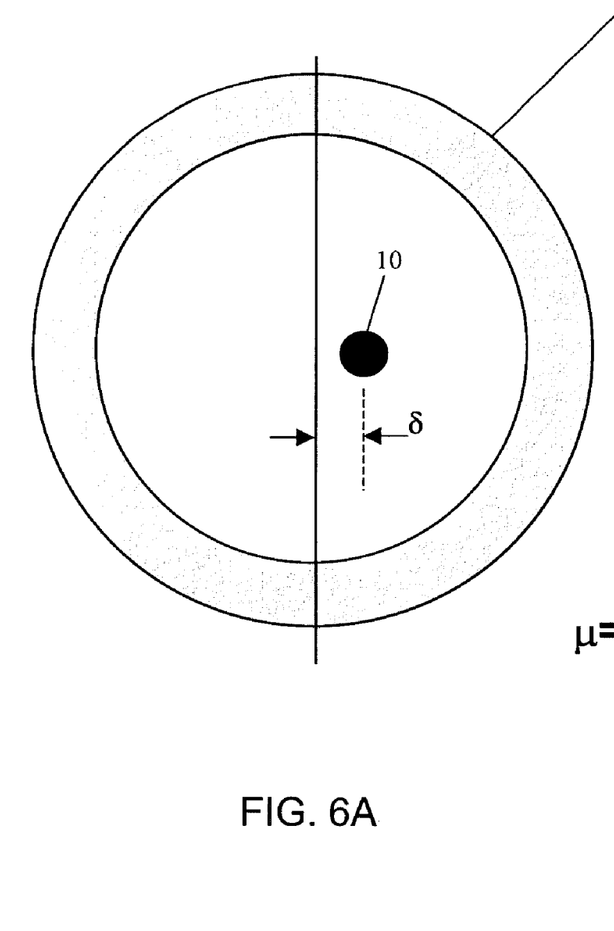
FIG. 6A and FIG. 6B, collectively referred to herein as FIG. 6, depict aspects of modeling the effects of the current flowing offset to the center of the logging instrument.
Figure 6B:
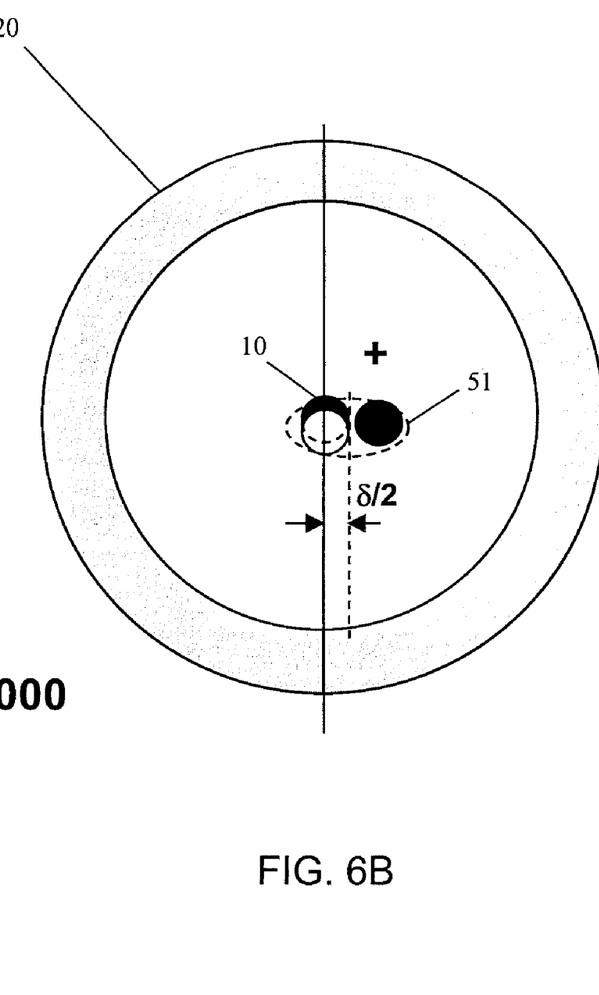

The distribution of magnetic flux in the case of $\mu=1000$ as shown in FIG. 5B is not much different from the case of $\delta=0$ as shown in FIG. 4B. The core 20 with a magnetic material provides a shielding effect that practically makes the transversal receiver coil 22 immune to nonzero offset. FIG. 6 illustrates the shielding effect using a vertical cross-sectional view of the conductive support 10 and the core 20. FIG. 6A shows the conductive support 10 with an offset greater than zero. FIG. 6B models the configuration of FIG. 6A by using the superposition of the conductive support 10, positioned at the center of the core 20 (i.e., zero offset), on a linear magnetic dipole 51, positioned with an offset from center of $\delta/2$. Because the conductive support 10 with zero offset is symmetrically positioned within the core 20, current flowing in the conductive support 10 does not produce the error signal in the transversal receiver coil 22 disposed at the exterior surface of the core 20. Due to the shielding effect of the magnetic core 20, the magnetic field of the linear magnetic dipole 51 does not substantially penetrate beyond the wires of the coil 22. Therefore, the total magnetic flux produced by the magnetic dipole 51 in the coil 22 is close to zero and is represented as:

$$\Psi_{|r|<r_0} = \int_{-r_0}^{r_0} B_{xdipole} dy \approx 0.$$

Table 1 presents the results of two-dimensional modeling of the transversal receiver coil 22 disposed on the exterior surface of the core 20 with offsets of 5 mm and 10 mm. The results confirm the qualitative discussion about the shielding provided by the core 20 from an asymmetrical magnetic field internal to the core 20.

TABLE 1

| δ | Error Voltage ($\omega = 10^5$), mV/m/A | | Relative Error $\mu = 1/\mu = 1000$ | |
|---|---|---|---|---|
| | $\mu = 1$ | $\mu = 1000$ | Ratio | Sensitivity normalized |
| 5 mm | 1.50 | 0.023 | 65.2 | 120 |
| 10 mm | 3.01 | 0.045 | 66.9 | 123 |

In addition to the shielding provided by the magnetic core 20, the magnetic core 20 also enhances sensitivity of the transversal receiver coil 22. The increased sensitivity is taken into account when calculating the total effect of the magnetic core 20 on the error signal (see the last column of Table 1).

Figure 7:
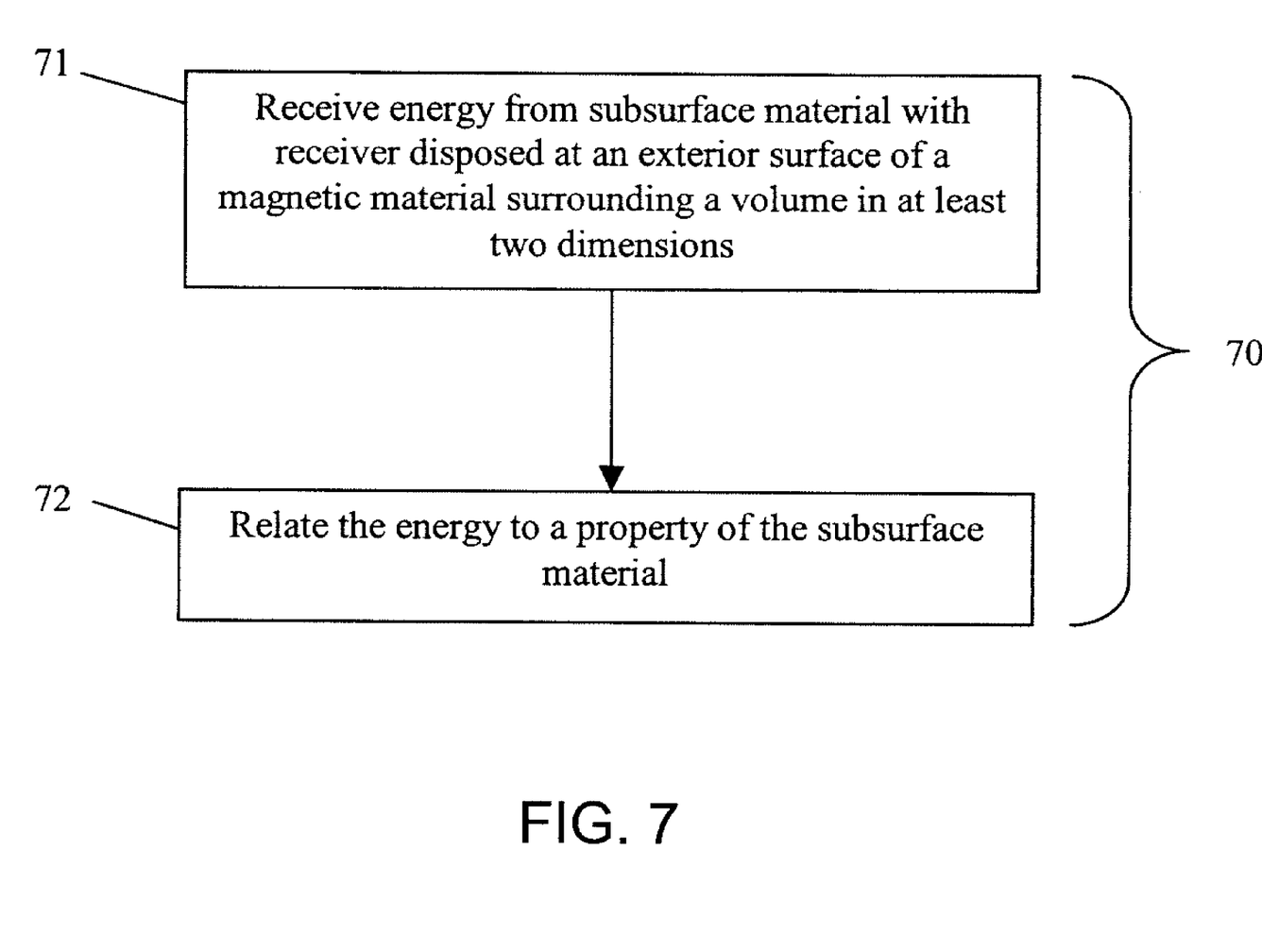
FIG. 7 presents one example of a method for measuring a property of a subsurface material.

FIG. 7 presents one example of a method 70 for measuring a property of a subsurface material. The method 70 calls for (step 71) receiving energy from the subsurface material. Step 71 is performed using a receiver disposed at an exterior surface of a magnetic material wherein the magnetic material surrounds a volume in at least two dimensions. In general, a current carrying component is disposed within the volume. The current in the component creates the magnetic field 6, which is shielded by the magnetic material. Further, the method 70 calls for (step 72) relating the energy to the property of the subsurface material. In one embodiment, the energy can be a current, a voltage, or signal induced in the transversal receiver coil 22.

In support of the teachings herein, various analysis components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An instrument for measuring a property of a subsurface material, the instrument comprising:
   an electrically conductive support structure;
   a magnetic material surrounding the support structure in at least two dimensions, the magnetic material having a shape configured to surround a volume in the at least two dimensions in which a magnetic field exists due to current flow through the support structure; and
   a receiver adapted for receiving energy related to the property of the subsurface material;
   wherein the receiver is disposed at an exterior surface of the magnetic material and is asymmetrically positioned relative to a direction of current flowing through the support structure, and wherein the shape of the magnetic material is asymmetric around the support structure.

2. The instrument of claim 1, wherein the receiver includes one or more coils defining a central axis that is offset relative to a center point of the support structure.

3. The instrument of claim 1, wherein a plane of the coil comprises a component transverse to a borehole axis.

4. The instrument of claim 1, wherein the magnetic material is shaped as a hollow cylinder.

5. The instrument of claim 1, wherein the magnetic material comprises ferrite.

6. The instrument of claim 1, wherein the magnetic material comprises a permeability of greater than about twenty newtons per ampere squared.

7. The instrument of claim 1, wherein the magnetic material and the receiver are adapted for insertion into a borehole penetrating the subsurface material.

8. The instrument of claim 1, wherein a component of the instrument is disposed in the volume.

9. The instrument of claim 8, wherein the component is a conductive support.

10. The instrument of claim 1, wherein the instrument is adapted for at least one of induction logging and nuclear magnetic resonance logging.

11. The instrument of claim 1, wherein the central axis of the receiver is at least substantially parallel to a longitudinal axis of the support structure.

12. The instrument of claim 1, wherein the central axis of the receiver is at least substantially parallel to a direction of the current flow through the support structure.

13. The instrument of claim 1, wherein the magnetic material comprises a uniform thickness.

14. The instrument of claim 1,
wherein the receiver has a cylindrical shape defining a center point in the at least two dimensions, and the electrically conductive support structure is disposed within the cylindrical shape and is offset from the center point in the at least two dimensions.

15. The instrument of claim 1, wherein the receiver defines a two-dimensional shape in a plane parallel to a longitudinal axis of a borehole, and the electrically conductive support structure is offset from a center point of the two-dimensional shape.

16. The instrument of claim 1, wherein the receiver defines a two-dimensional shape in a plane perpendicular to a longitudinal axis of a borehole, and the electrically conductive support structure is offset from a center point of the two-dimensional shape.

17. A method for measuring a property of a subsurface material, the method comprising:
receiving energy from the subsurface material using a receiver disposed at an exterior surface of a magnetic material, wherein the magnetic material surrounds an electrically conductive support structure and has a shape configured to surround a volume in the at least two dimensions in which a magnetic field exists due to current flow through the support structure, and the receiver is asymmetrically positioned relative to a direction of current flowing through the support structure, and wherein the shape of the magnetic material is asymmetric around the support structure; and
relating the energy to the property of the subsurface material.

18. The method of claim 17,
wherein the receiver includes one or more coils defining a central axis that is offset relative to a center point of the support structure.

19. The method of claim 17, wherein the energy comprises at least one of current and voltage induced in the receiver.

20. The method of claim 17, wherein the method is implemented by a computer program product stored on machine-readable media.

21. The method of claim 17,
wherein the receiver has a cylindrical shape defining a center point in the at least two dimensions, and the electrically conductive support structure is disposed within the cylindrical shape and is offset from the center point in the at least two dimensions.

22. The method of claim 17, wherein the receiver defines a two-dimensional shape in a plane parallel to a longitudinal axis of a borehole, and the electrically conductive support structure is offset from a center point of the two-dimensional shape.

23. The method of claim 17, wherein the receiver defines a two-dimensional shape in a plane perpendicular to a longitudinal axis of a borehole, and the electrically conductive support structure is offset from a center point of the two-dimensional shape.

* * * * *